(12) United States Patent
Myr

(10) Patent No.: US 8,195,473 B2
(45) Date of Patent: Jun. 5, 2012

(54) METHOD AND SYSTEM FOR OPTIMIZED REAL ESTATE APPRAISAL

(75) Inventor: David Myr, Jerusalem (IL)

(73) Assignee: Makor Issues and Rights, Ltd., Jerusalem (IL)

( * ) Notice: Subject to any disclaimer, the term of this patent is extended or adjusted under 35 U.S.C. 154(b) by 1396 days.

(21) Appl. No.: 10/610,955

(22) Filed: Jul. 1, 2003

(65) Prior Publication Data

US 2004/0254803 A1    Dec. 16, 2004

(30) Foreign Application Priority Data

Jun. 11, 2003   (IL) .......................................... 156392

(51) Int. Cl.
*G06Q 10/00*       (2006.01)
(52) U.S. Cl. ....................................................... 705/1.1
(58) Field of Classification Search ................. 705/1, 1.1
See application file for complete search history.

(56) References Cited

U.S. PATENT DOCUMENTS

| | | | | |
|---|---|---|---|---|
| 6,876,955 | B1 * | 4/2005 | Fleming et al. ............... | 702/194 |
| 7,711,574 | B1 * | 5/2010 | Bradley et al. ................. | 705/10 |
| 2001/0039506 | A1 * | 11/2001 | Robbins .......................... | 705/10 |

OTHER PUBLICATIONS

Newsletter of The INFORMS Computing Society, Spring 2002.*
Non Linear Programming Frequently Asked Questions, May 1, 2002, NorthWestern University and Argonne National Library.*
Galaty, Allaway, Kyle, Modern Real Estate Practice, 2002, Dearborn Financial Publishing, Inc.*
The Appraisal Foundation, Uniform Standards of Professional Appraisal Practice—2003 Edition, pp. 20 and 180 (2003).
Orgel, L., Valuation Under the Law of Eminent Domain—Second Edition, vol. 1, pp. 170-171, The Michle Company, Law Publishers, Charlottesville, VA (1953).
Eaton, J.D., Real Estate Valuation in Litigation—Second Edition, pp. 422 and 429, The Appraisal Institute, Chicago, IL.
Kelliher, C.F, et al., Using Monte Carlo Simulation to Improve Long-Term Investment Decisions, The Appraisal Journal, vol. LXVIII, No. 1, pp. 44-56 (Jan. 2000).
Moré, J.J., et al., Optimization Software Guide, Society for Industrial and Applied Mathematics, pp. 96-97, Philadelphia (1993).
Website: www.lindo.com—Lingo Solver Page (Aug. 11, 2003).

* cited by examiner

*Primary Examiner* — Naresh Vig
(74) *Attorney, Agent, or Firm* — RatnerPrestia

(57) ABSTRACT

A method and a system for obtaining optimal range of values for real estate property by using all or some of the admissible appraisal approaches through optimization algorithm. The reliability of factor ranges specific to each appraisal approach is evaluated and discrepant ranges are eliminated. An accurate property valuation through a number of admissible appraisal approaches is possible. Valuation, Feasibility Study, Sensitivity Analysis, value reconciliation and highest and best use are obtained optimally and automatically. Capitalization rate and period are optimized in the relevant approaches.

13 Claims, 4 Drawing Sheets

METHOD AND SYSTEM FOR OPTIMIZED REAL ESTATE APPRAISAL

BACKGROUND OF THE INVENTION

Real estate appraisal techniques are far from an exact science. Typically, the appraiser compares recent sales of the properties comparable to a subject property in order to determine the property's market value. Next, he adjusts the sales prices of comparable properties to reflect the physical characteristic differences from the subject property. Generally, this process may take several days to complete and it may also suffer from insufficient comparative results due to the time and other technical constraints. Furthermore, the preferred criterions by which comparative properties were selected are not always obvious or immediately available and therefore results are less verifiable.

Many automated valuation models (AVM) have been introduced to avoid some of the shortcomings of the traditional models.

"An AVM is a computer software program that analyses data using an automated process. For example, AVMs may use regression, adaptive estimation, neural network, expert reasoning, and artificial intelligence programs.

The output of an A VM is not, by itself, an appraisal. An AVM 's output may become basis for appraisal, appraisal review, or appraisal consulting opinion and conclusions if the appraiser believes the output to be credible and reliable for use in a specific assignment". (USPAP 2003 Edition p.180)

U.S. Pat. No. 5,857,174 discloses a real estate appraisal method in which the buyer of a property assigns points to a subject property and each comparable property based upon an Ideal Point System (IPS). The points assigned (or IPS values) upon the desirability factors for each of five categories of criteria. The total possible IPS value for any property is 100, corresponding to a 100 percent desirability. Once the IPS values are determined, the property may be subsequently used as a comparable property. The appraiser needs only to select a subject property and to obtain the IPS values for the subject property. The sale price of each comparable property is then adjusted, based on the relative difference between the IPS values for the comparable properties and the IPS values of the subject property, by dividing the total IPS value for each comparable property by the IPS value for the subject property to obtain a composite adjustment ratio. The adjustment ratio for each comparable property is then multiplied by the sales price to obtain an adjusted sales price. Any greatly divergent adjusted sales prices are discarded, and the average adjusted sales price is determined. The average adjusted sales price is used as the appraised value for the subject property.

U.S. Pat. No. 5,414,621 discloses a system and method for determining comparative values of comparable properties based on assessment of percentages and sales data of the comparable properties to ultimately determine a value for a subject property. In a first embodiment, the "assessment percentage" is the "base property tax" for the subject property and comparable property. A price/tax factor is computed for each comparable property by dividing the sale (or sold) price of the comparable property by its base tax. The price/tax factor for each comparable property is then multiplied by the base tax of the subject property to generate a net comparative value for each comparable property. To take into account appreciation for recently sold comparable properties, an average appreciation is obtained for the area in which the subject and comparable properties are located. The average appreciation is pro rated to determine the comparative value for each comparable property. On the basis of the comparative values and other pertinent information, the value of the subject property may be set by a real estate agent, bank, appraiser, etc.

U.S. Pat. No. 6,058,369 discloses that by gathering information regarding the total number of sales, total number of pending listings, total number of active listings, and total number of expired listings in a time period, a market index may be derived. This market index can then be charted over a plurality of periods, giving an indication of any temporal trends. The market index can further be used to guide and determine the action of a service provider such as a lender or title insurance company in a proposed real estate transaction.

U.S. Pat. No. 6,178,406 B1 discloses a method for estimating the price of real estate property such as a single-family residence. A set of real estate properties comparable to the subject property is retrieved. The comparable properties and the subject property are characterized by a plurality of common attributes each having a respective value. Each attribute value from the comparable properties is evaluated to the same attribute value of the subject property on a fuzzy preference scale indicating desirable and tolerable deviations from an ideal match with the subject property. A measurement of similarity between each comparable property and the subject property is then determined. Next, the prices of the comparable properties are adjusted to the value of the subject property and the best properties are extracted for further consideration. The extracted comparable properties are then aggregated into an estimate price of the subject property.

U.S. Pat. No. 6,115,694 discloses a computer-implemented method for validating specified prices on real estate property. A set of real estate properties comparable to the subject property is retrieved. A measurement of similarity between each comparable property and the subject property is then determined. A plurality of adjustment rules is then applied to adjust the price of the comparable properties. The adjusted comparable properties are then extracted, sorted, and ranked, according to the specified sale price. The extracted comparable properties are then aggregated into an estimate price of the subject property. After aggregation, the estimate price of the subject property is compared to the specified price and a measurement of confidence validating the reliability of the specified price is then generated.

U.S. APP. A1 20020002494 discloses a system for facilitating appraisals. A lender and/or customer may request an appraisal from a hub. The hub checks the schedules of local appraisers, selects an appraiser and schedules the appraisal. Once the appraisal has been completed, the appraiser uploads the appraisal information and the hub transfers the information to the requestor or other customer. The hub may also store the appraisal and information about the uploaded appraisal for analysis regarding the appraised property or the appraiser's work product.

U.S. APP. A1 20010039506 discloses a real estate appraisal method wherein a database of enhanced records of properties in the same territory as the subject property is used to derive market-driven value adjustment rates for property attributes and time differentials. The adjustment rates are applied to the properties in the database, the most similar comparable properties are selected on the basis of similarity in property attributes and the market value is then estimated from the selected most similar comparable properties. The resulting valuation is supportable by market conditions and can be printed on specified forms.

U.S. APP. A1 20020147695 discloses a system for automating the process of valuing a property that produces an estimated value of a subject property, and a quality assessment of the estimated value. The process is a generative artificial intelligence method that trains a fuzzy-neural network using a subset of cases from a case-base, and produces a run-time system to provide an estimate of the subject property's value. In one embodiment, the system is a network-based implementation of a fuzzy inference based on a system that implements a fuzzy system as a five-layer neural network so that the structure of the network can be interpreted in terms of high-level rules. The neural network is trained automatically from data. IF/THEN rules are used to map inputs to outputs by a fuzzy logic inference system. Different models for the same problem can be obtained by changing the inputs to the neuro-fuzzy network, or by varying its architecture.

With the advancement of computer software and statistical models and methods such as Monte Carlo, simulation in income estimates became viable solution to otherwise lengthy analytical processes. Using this simulation in Discount Cash Flow (DCF) modeling, it became more feasible to quantitatively estimate the impact of uncertainty on the market value estimates and improve long-term investment decisions. Monte Carlo simulation also does not require rigorous certainty or normality assumptions about the input values.

Instead, each input in the model is represented by a probability density function, or a range of values that are possible, and not just a single, most likely value.

A simulation model allows users to run thousands of iterations quickly (each representing a separate "what if" analysis) and summarizes the entire range of possible outcomes efficiently providing practitioners with valuable insights about the relationship between outcomes and uncertain inputs. (The Appraisal Journal, January 2000, pp.44).

While the Monte Carlo simulation eliminates the problem of single-point values, this approach is used only in specific applications such as DCF modeling it is not generally used in overall appraisal process.

The appraiser services are now available in forms of commercial software, which was introduced to facilitate appraiser information processes.

A La Mode, Inc., providing an appraisal-related information and services including appraiser listings, technology/EDI updates, and software information;

ACI Development, providing a software solutions, including electronic forms, digital imaging, and communications software, for the real estate appraisal, home inspection, and insurance industries;

Appraiser's ToolBox, providing Windows (from the Microsoft Corporation) and Mac (from the Apple Computer, Inc.) form processing software with integrated tools;

CSA, Inc., providing Canadian appraisal forms (including the CERC) and CRAL software;

Day One, Inc., providing an office management systems and appraisal forms software;

Eminent Domain Software, providing a real estate software for appraisers, inspectors and tax assessors;

MicroSolve, providing software for local governments to assess property values and maintain property databases;

PSAR Systems, providing a residential appraisal software; and

United Systems Software Company, providing an appraisal software, electronic forms solutions, EDI, and artificial intelligence.

Many of these known AVM systems focus on providing an estimate of value that has been derived from a number of transactions. Often the analysis is made based on the property records (limited to parcel level inventories) sometimes of questionable quality. Generally, most of these models attempt to facilitate gathering of comparable data according to one appraisal approach, typically the market approach.

Other References Cited

Uniform Standards of Professional Appraisal Practice (USPAP) 2003 Edition

The Appraisal of Real Estate, Appraisal Institute

Valuation Under the Law of Eminent Domain, Lewis Orgel, 1953

Real Estate Valuation in Litigation, J. D. Eaton, Appraisal Institute, 1995

More, Jorge J. and Stephen J. Wright, Optimization Software Guide, Philadelphia: SIAM, 1993

The appraised values produced by different independent appraisers for the same property can vary by as much as 50%. The discrepancy in estimates can be attributed to several different factors but typically is caused by different sets of most "relevant units of comparisons" as developed in each estimating approach by various appraisers.

An appraiser often employs more than one approach to perform the valuation. In Eminent Domain or other litigation processes it is always recommended to use several approaches to establish convincing argument for the final property valuation.

Each appraisal approach, used in valuation, is influenced by a number of different factors. Some of the factors are used in several approaches and others are not shared by other approaches.

Typically, appraisers apply the sales comparison (Sales Comparison Approach), income capitalization (Income Approach) and cost (Cost Approach) individually. When more than one approach is applied, typically different values are obtained for each approach. After reviewing the reliability of data and analyzing the difference between valuation results, the appraiser determines the final value (reconciliation or correlation).

It should be noted that the reconciliation of all estimate values is typically required in Eminent Domain and other litigation cases, where the appraiser is required to substantiate the accuracy of his analysis.

Standards Rule 1-6 (USPAP 2003) states:

In developing a real property appraisal, an appraiser must:

(a) reconcile the quality of data available and analyzed within the approaches used; and (b) reconcile the applicability or suitability of the approaches used to arrive at the value conclusion(s)

In traditional appraisal practice, appraisers first determine various approaches that will best serve the valuation process for the subject property using specific data and factors pertaining to that approach. To facilitate the evaluation, each factor is then typically expressed as a single-point value. Obviously, any error in the assumed value for one or more selected factors will inevitably affect the final result. Generally, even Sensitivity Analysis check cannot fully eliminate these types of errors since this analysis only checks what happens if we adjust a factor value and cannot identify factors that might possibly be erroneous completely.

In order to arrive at a final conclusion of a value for the property, the appraiser must reconcile the different values obtained from different approaches. While some appraisers feel they should express the property value in a form of value ranges, very often they are required to provide a specific price figure, called point estimate. Clearly, by averaging the differing results from various estimates, another level of error is introduced into the final estimate already based on individually adjusted single values. Usually, appraisers are comparing valuation results from all different approaches and taking an average result as a final value. However, this would imply that each approach has equal strength and reliability which is rarely true.

Real estate appraisals are used in large variety of real estate transactions. They generally require considerable effort and time to prepare and are relatively expensive.

Little or no work deals directly with optimization programming in appraisal domain and especially in using all influence factors in all approaches together rather than in one approach. In appraisals and especially in litigation cases there is a strong need to prove the accuracy of valuation process and of the final result.

DETAILED DESCRIPTION OF THE INVENTION

Figure 1A:
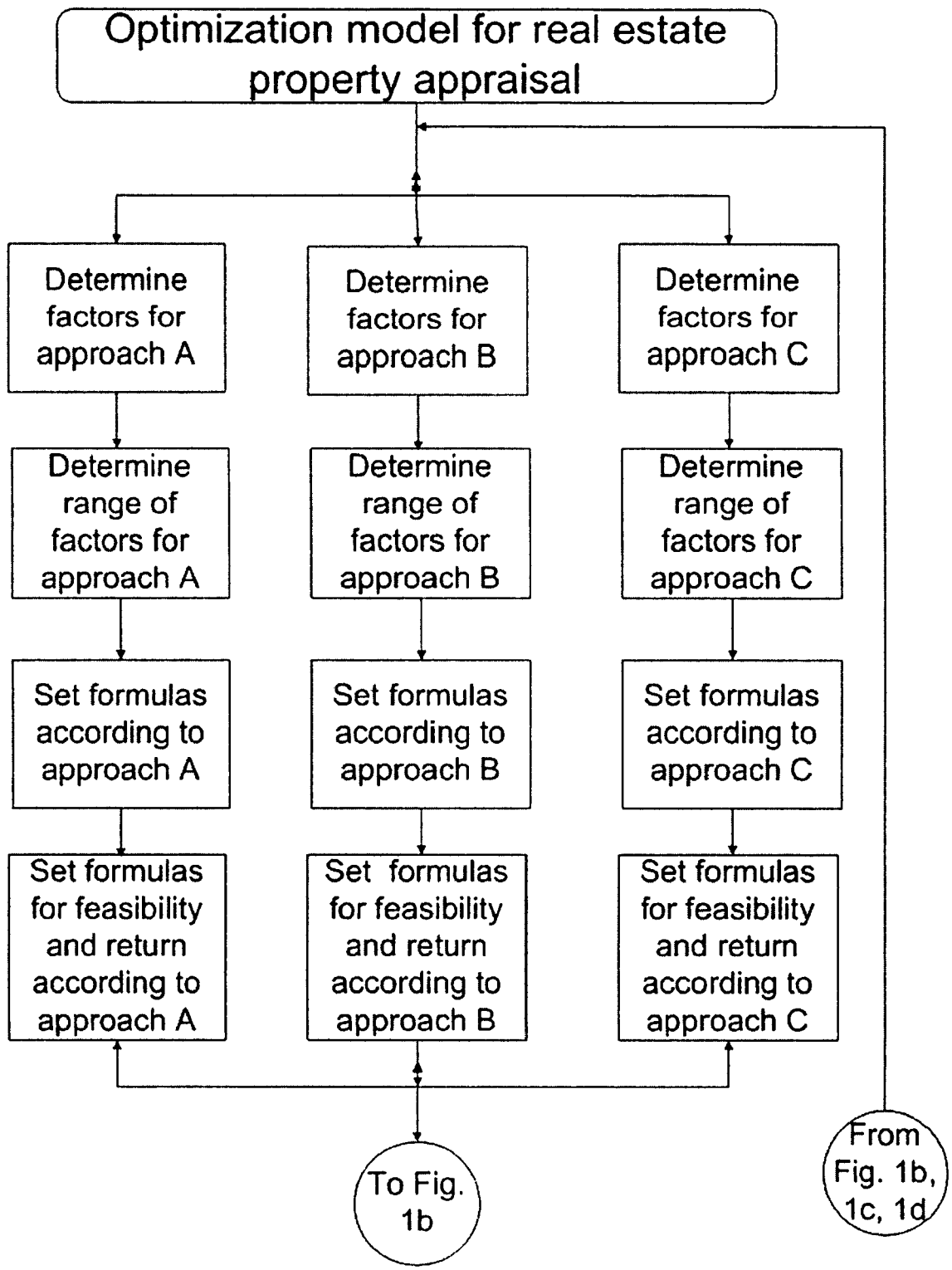
FIG. 1a shows a first part of the flowchart of an invented optimization method and system.
Figure 1B:
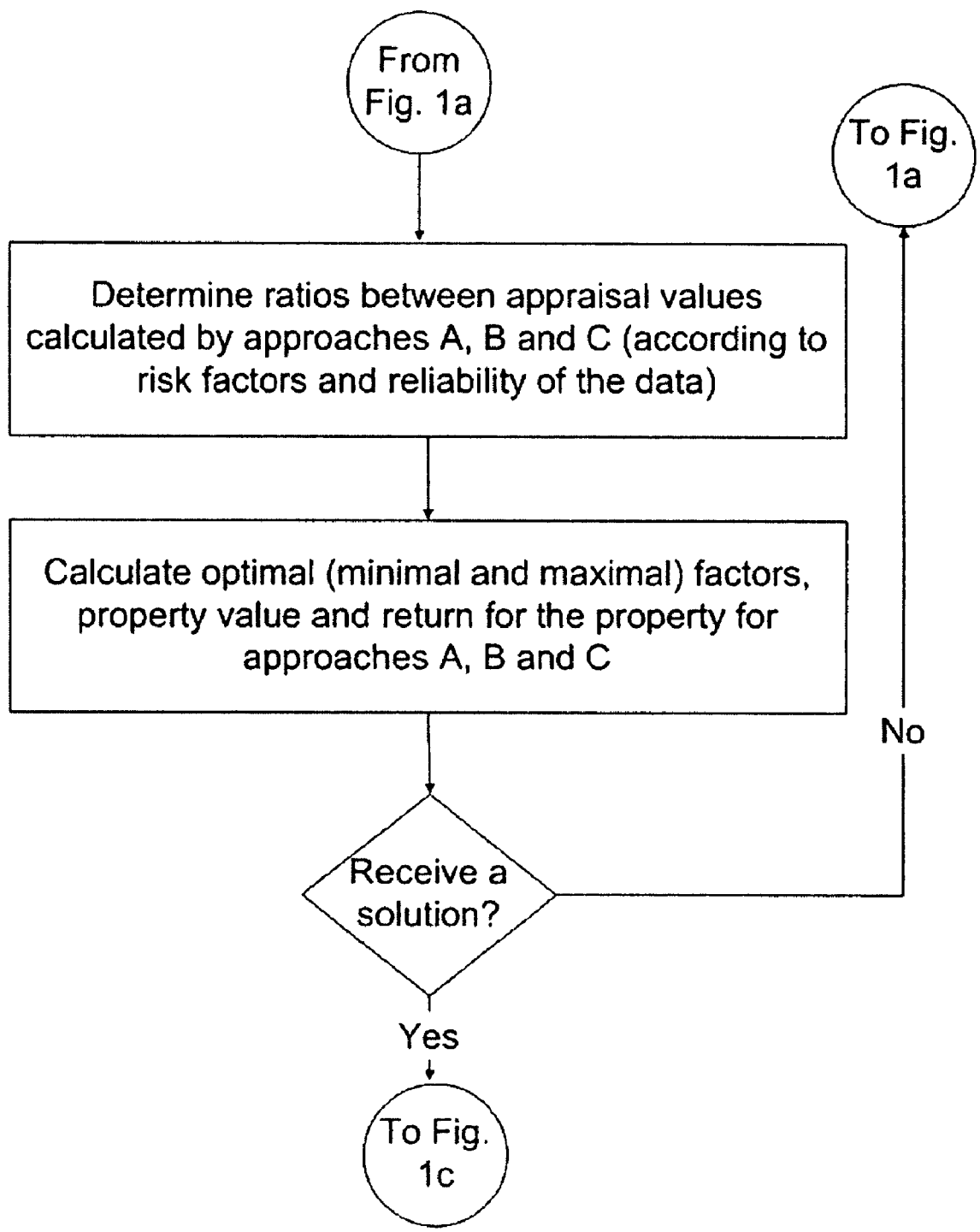
FIG. 1b shows a second part of the flowchart.
Figure 1C:
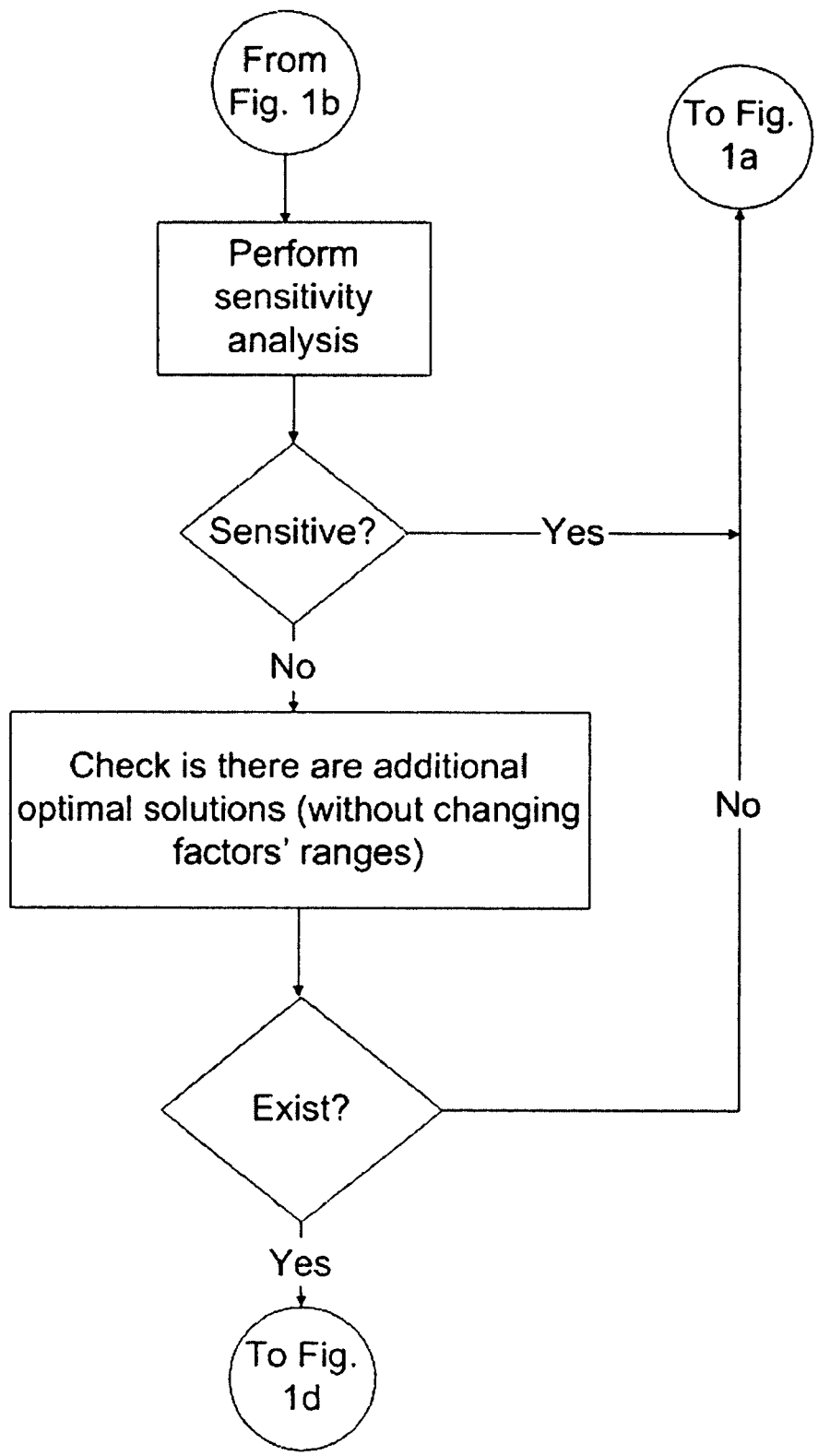
FIG. 1c shows a third part of the flowchart.

This invention relates to the real estate appraisal field.

The system uses ranges of influence factors rather than their single-point values. The disclosed optimization method and system is based on all plausible ranges of influenced factors of all approaches used together instead of each particular appraisal approach used separately. Therefore, crucial dependence of property value on single erroneously selected values of influenced factors is greatly reduced.

The optimization system described here belongs to nonlinear programming because of nonlinearities brought into the objective function by some of the influenced variables.

It is based on four groups of entities:
1. objective function,
2. constant parameters,
3. variable influenced factors, and
4. constraints.

Objective function is the quantity that is going to be optimized, i.e. maximized or minimized. Here the objective function is to obtain the indicated value of the subject property.

Constant parameters are the parameters whose values are fixed a priori, e.g. building area, various taxes, etc.

Influence factors (or control variables) are relevant factors that are known to lie within some ranges of values and could be changed in the process of searching for minimum or maximum of the objective function, e.g. price of land per square meter of the building, costs per square meter of building.

Constraints are used to limit values of influence factors (or control variables) are set by the user or appraiser based on comparable data or experience. Generally, if the constraints are too restrictive, they may produce "no-solution" scenarios, i.e. the approaches used are not conforming one with others regarding the specific property valuation.

Optimization Algorithm Description

Objective function is:

$$\min/\max NPV_1 = \sum_i S_i^1 (1 + r_i^1)^{-d_i^1/365},$$

subject to:

$$m_i^k \leq S_i^k \leq M_i^k; \quad (1)$$

$$NPV_1 = p_2 \cdot NPV_2 = \ldots p_K \cdot NPV_K; \quad (2)$$

thus min/max $$NPV_k = \sum_i S_i^k (1 + r_i^k)^{-d_i^k/365};$$

$0 \leq d_i^k \leq F_k$ (approach alternative k time frame); (3)

$d_i^k - d_j^k \leq D_{ij}^k$ (time relation between task i and task j in project alternative k). (4)

where:
(a) $S_i^k$ are control variables: negative payments or positive receipts for task i in approach alternative k;
(b) $m_i^k, M_i^k$ are constants;
(c) $r_i^k$ are control variables: interest of capitalization for task i in approach alternative k;
(d) $p_k \geq 1$ are control variables that are linking coefficients between different approaches alternatives; k=2, ..., K (the value of p is determined according to the reliability of the data and/or risk considerations);
(e) $d_i^k > 0$ are optional control variables: date of task i in approach alternative k, in case that these dates are not fixed;
(f) $NPV_k$ is optimal NPV for approach alternative k,
k=1,2, ..., K is current number of the approach alternative,
K is total number of the approach alternatives.

Description of the Method and System

The flowchart of the optimization model is graphically presented in FIG. 1a, FIG. 1b, FIG. 1c and FIG. 1d as follows:

To start the optimal property valuation process, the appraiser chooses which factors could influence the appraisal value for all appraisal approaches used.

For each influenced factor we determine minimal and maximal limits of the value. The minimal and maximal limits are determined from the comparable data. Then, ranges of influence factors are estimated for all approaches (A, B and C in the flowchart) to determine the value and the investment return.

In the next step, formulas are set and summarized for determining property value for each of the approaches (A, B and C in the flowchart).

In the next step, the appraisal has to set and summarize formulas for determining feasibility and investment return according to each one of the approaches.

In the next step, the appraiser determines ratios between appraisal values as will be calculated by all approaches used (according to risk factors and reliability of the data).

Now, the nonlinear optimization algorithm calculates automatically for all approaches used, according to Mathematical Definition paragraph hereafter:
1. minimal and maximal optimal property value;
2. minimal and maximal optimal investment return;
3. sensitivity analysis;
4. multi solution.

Outlier Discrepancy Elimination: The presented optimization method will help to identify correct influenced factors ranges by eliminating discrepancies and/or outliers of the ranges automatically.

Feasibility Study: Feasibility Study is performed to determine whether the subject property and its valuation will meet the economic return requirements of a specific entrepreneur and/or investor. In the invention, the optimal expected return is calculated for all approaches used together for the specific property.

Capitalization rate and period: In the invention, the optimal capitalization rate and period are calculated for all approaches used together for the specific property value and for the Feasibility Study for the same property.

Sensitivity Analysis: Sensitivity Analysis is performed to check whether our result is sensitive to changes in each of influence factors. The lower the sensitivity the better is our result since we can conclude that change in one of the factors ranges is not affecting our final optimal result, and even if we change some of the factors ranges, we still would arrive to a similar optimal appraised range of values. High sensitivity must be avoided since it potentially increases model inaccuracy. It is clear, that if the property value estimate has high dependency on a specific factor based on questionable data, the overall accuracy may be affected. After it has been established that the obtained results are no longer sensitive, the system proceeds to obtain final maximum and minimum optimal results for the given property.

"Multi Solution": When optimal solution has been reached automatically, the system searches further for possible additional optimal solutions ("multiple solutions"). In multiple solutions the objective function and factors ranges unchanged and only optimal values of variables vary. It is assumed that single solution indicates that the factor ranges may be too restrictive and therefore the optimal solution is reached but is not flexible enough.

Reconciliation: The appraiser is free to choose any number of approaches for his estimate and commonly will prefer a particular approach to others due to more accurate data or specific property characteristics. However, sometimes the highest maximum and minimum values obtained are relatively far from median range i.e. most likely value ranges. Obviously, a simple average of all indicated values, used in the traditional reconciliation methods will not necessarily give a "true" property value.

In this invention, a range of optimal values in all approaches has been reached automatically. If the single-point valuation is still required, it is up to the appraiser to decide if he would choose the maximum, minimum or average value for the final property value. Usually, the decision depends on reliability of data used and it is done automatically according to appraiser-defined rules.

Figure 1D:
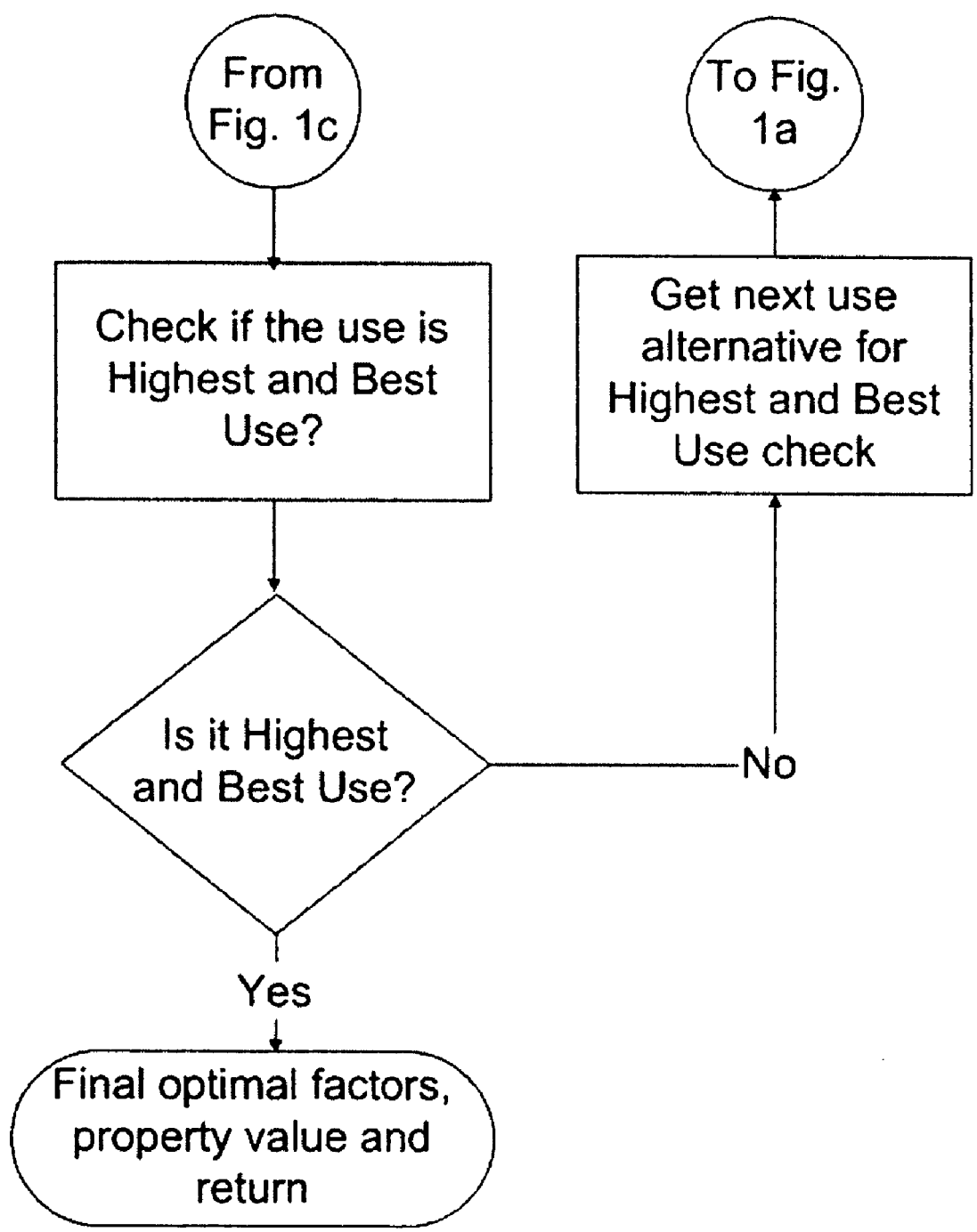
FIG. 1d shows a fourth part of the flowchart.

Highest and Best Use: The invention helps to determine financial feasibility criteria in highest and best use analysis separately for each use or for all uses. The graphical illustration of this process is shown in FIG. 1d.

In the event, that no solution is found, the system will require more data to satisfy the constraints or to modify existing constrains. In this case, an optimization algorithm may terminate without producing minimum or maximum value because of convergence problems resulting from non-linear nature of the objective function. In such cases, it may also be helpful to try to start again with different initial values or other value adjustments.

Global Optimum: A number of software packages available today are capable of solving such problems such as MS Excel Solver, LINGO and other optimization software. In general, algorithms found in commercial software packages are capable of searching only for a local minimum or maximum which may or may not constitute the global optimum solution, therefore there is a need to assure that the global optimum solution has been reached by using optimization software that finds the global optimum solution, such as LINGO.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A computer system implemented method of automatically computing from data received by a computer-based value appraising system an optimal appraisal value of a real estate property, where all of different types of appraisal approaches are used together to optimize a nonlinear objective function, the method comprising the steps of:
   a) storing, by the computer-based value appraising system, influence factors and a range of influence factor values for each of the different types of appraisal approaches;
   b) defining, by the computer-based value appraising system, the nonlinear objective function that includes control variables representing the stored influence factors for all of the different types of appraisal approaches;
   c) using and causing a microprocessor to perform nonlinear programming of the nonlinear objective function to simultaneously optimize the nonlinear objective function for all of the different types of appraisal approaches by adjusting the control variables within the corresponding range of influence factor values;
   d) determining, by the computer-based value appraising system, an optimal range of appraisal values for the real estate property from the optimized nonlinear objective function according to each of the different types of appraisal approaches; and
   e) outputting the optimal appraisal value to the user based on the optimal range of appraisal values,
   where all of the different types of appraisal approaches are used together to optimize the nonlinear objective function.

2. The computer system implemented method according to claim 1, step (a) further including the step of automatically optimizing the stored range of influence factor values of each of the different types of appraisal approaches.

3. The computer system implemented method according to claim 1, step (c) further including the step of automatically eliminating all discrepancies or outliers of the stored influence factors.

4. The computer system implemented method according to claim 1, step (d) further including the step of automatically obtaining a respective optimal range of appraisal values for each of the different types of appraisal approaches.

5. The computer system implemented method according to claim 1, step (d) further including the step of automatically performing a feasibility study to determine whether the optimal range of appraisal values meets predetermined economic return requirements for the real estate property.

6. The computer system implemented method according to claim 1, step (d) further including the step of automatically performing a sensitivity analysis using the stored influence factors for each of the different types of appraisal approaches together to determine a sensitivity of the optimal range of appraisal values to changes in each of the stored influence factors.

7. The computer system implemented method according to claim 1, wherein the method automatically reconciles the optimal range of appraisal values for each of the different types of appraisal approaches.

8. The computer system implemented method according to claim 1, the method further including the step of repeating step (c) to search for combinations of the stored influence factors that automatically produce a same optimal value as for the stored influence factors individually.

9. The computer system implemented method according to claim 1, step (d) further including the step of automatically performing a highest and best use analysis to determine a financial feasibility criteria for each separate use.

10. The computer system implemented method according to claim 1, wherein the nonlinear objective function uses project periods that are considered in one of the different types of appraisal approaches.

11. The computer system implemented method according to claim 1, step (d) further including the step of optimally calculating different capitalization rates that are considered in one of the different types of appraisal approaches.

12. A system for providing an automatic and optimal appraisal of a real estate property, the system comprising:
  at least one memory comprising computer-executable instructions to store influence factors and a range of influence factor values for each of different types of appraisal approaches, and at least one data processor that executes the instructions;
  a computer-readable medium comprising computer-executable code for causing a processor to perform: 1) defining a nonlinear objective function that includes control variables representing the stored influence factors for all of the different types of appraisal approaches, 2) nonlinear programming of the nonlinear objective function to simultaneously optimize the nonlinear objective function for all of the different types of appraisal approaches, by adjusting the control variables within the corresponding range of influence factor values and 3) determining an optimal range of appraisal values for the real estate property from the optimized nonlinear objective function according to each of the different types of appraisal approaches; and
  an output for indicating the optimal range of appraisal values for the real estate property,
  wherein each of the different types of appraisal approaches are a sales comparison approach, an income capitalization approach and a cost approach,
  all of the different types of appraisal approaches are used together to optimize the nonlinear objective function, and
  an appraisal of the real estate property is generated based on the optimal range of appraisal values.

13. A system for providing an automatic and optimal appraisal of a real estate property, the system comprising:
  at least one memory for storing influence factors and a range of influence factor values for each of different types of appraisal approaches;
  a processor, coupled to the at least one memory, the processor is programmed to perform the optimal appraisal by: 1) defining a nonlinear objective function that includes control variables representing the stored influence factors for all of the different types of appraisal approaches, 2) nonlinear programming of the nonlinear objective function to simultaneously optimize the nonlinear objective function for all of the different types of appraisal approaches, by adjusting the control variables within the corresponding range of influence factor values and 3) determining an optimal range of appraisal values for the real estate property from the optimized nonlinear objective function according to each of the different types of appraisal approaches; and
  an output for indicating the optimal range of appraisal values for the real estate property,
  wherein each of the different types of appraisal approaches are a sales comparison approach, an income capitalization approach and a cost approach,
  all of the different types of appraisal approaches are used together to optimize the nonlinear objective function, and
an appraisal of the real estate property is generated based on the optimal range of appraisal values.

\* \* \* \* \*